(12) United States Patent
Zhu et al.

(10) Patent No.: US 9,652,743 B2
(45) Date of Patent: May 16, 2017

(54) BRAINSTORMING IN A CLOUD ENVIRONMENT

(75) Inventors: Zheren Zhu, Shanghai (CN); Yongyuan Shen, Shanghai (CN); Fu Zhao, Shanghai (CN); Yingyu Chen, Shanghai (CN); Bin Dong, Shanghai (CN); Zheng Long Wei, Shanghai (CN); Hui Wang, Shanghai (CN)

(73) Assignee: SAP SE, Walldorf (DE)

( * ) Notice: Subject to any disclaimer, the term of this patent is extended or adjusted under 35 U.S.C. 154(b) by 585 days.

(21) Appl. No.: 13/588,773

(22) Filed: Aug. 17, 2012

(65) Prior Publication Data

US 2013/0326346 A1    Dec. 5, 2013

(30) Foreign Application Priority Data

May 30, 2012   (CN) .......................... 2012 1 0175201

(51) Int. Cl.
    *G06F 17/00*      (2006.01)
    *G06Q 10/10*      (2012.01)
    *H04L 29/08*      (2006.01)

(52) U.S. Cl.
    CPC ........... *G06Q 10/101* (2013.01); *H04L 67/10* (2013.01)

(58) Field of Classification Search
    CPC ...................................................... G06F 15/16
    USPC ....................................................... 715/260
    See application file for complete search history.

(56) References Cited

U.S. PATENT DOCUMENTS

| | | | |
|---|---|---|---|
| 6,122,740 A | 9/2000 | Andersen | |
| 7,043,566 B1 | 5/2006 | Grant et al. | |
| 7,743,029 B2 | 6/2010 | Frey et al. | |
| 7,840,610 B2 | 11/2010 | Chandrasekharan et al. | |
| 7,991,745 B2 | 8/2011 | Bourbonnais et al. | |
| 2003/0037041 A1* | 2/2003 | Hertz | 707/1 |
| 2003/0093576 A1 | 5/2003 | Dettinger et al. | |
| 2005/0022106 A1* | 1/2005 | Kawai et al. | 715/500 |
| 2005/0081097 A1* | 4/2005 | Bacher | G06F 11/2023 714/13 |

(Continued)

OTHER PUBLICATIONS

Non-Final Office Action for U.S. Appl. No. 13/494,786, mailed Mar. 4, 2013, 23 pages.

(Continued)

*Primary Examiner* — Mustafa Amin
(74) *Attorney, Agent, or Firm* — Brake Hughes Bellermann LLP

(57) ABSTRACT

The embodiments provide a cloud brainstorming service implemented on at least one cloud server. The brainstorming service includes a message service component configured to receive a plurality of ideas, over a network, from one or more users of devices. The users represent members of a brainstorming session. The brainstorming service also includes a brainstorming logic component configured to process the plurality of ideas and store the plurality of processed ideas in an in-memory database system, and a clustering component configured to retrieve the plurality of processed ideas from the in-memory database system and arrange the plurality of processed ideas into one or more clusters, where each cluster is a group of similar ideas. The message service component is configured to provide the plurality of processed ideas that are arranged into the one or more clusters, over the network, to the one or more users for display.

20 Claims, 10 Drawing Sheets

(56) References Cited

U.S. PATENT DOCUMENTS

| | | | |
|---|---|---|---|
| 2005/0278321 A1* | 12/2005 | Vailaya | G06F 17/30864 |
| 2007/0061434 A1* | 3/2007 | Schmieder | H04L 69/32 |
| | | | 709/223 |
| 2007/0162341 A1 | 7/2007 | McConnell et al. | |
| 2007/0174360 A1 | 7/2007 | Yagawa | |
| 2007/0226296 A1* | 9/2007 | Lowrance et al. | 709/204 |
| 2008/0080718 A1* | 4/2008 | Meijer | G06F 21/6245 |
| | | | 380/282 |
| 2008/0209533 A1* | 8/2008 | Abrams | G06F 17/3089 |
| | | | 726/9 |
| 2008/0266449 A1* | 10/2008 | Rathod et al. | 348/468 |
| 2009/0094039 A1* | 4/2009 | MacDonald et al. | 705/1 |
| 2009/0157989 A1 | 6/2009 | Karamcheti et al. | |
| 2009/0292586 A1* | 11/2009 | Rasheed | 705/10 |
| 2010/0070542 A1* | 3/2010 | Feinsmith | 707/812 |
| 2011/0071981 A1* | 3/2011 | Ghosh | G06F 11/2025 |
| | | | 707/634 |
| 2011/0196713 A1* | 8/2011 | Boss et al. | 705/7.22 |
| 2012/0226515 A1* | 9/2012 | Boss et al. | 705/7.22 |
| 2012/0239879 A1 | 9/2012 | Kawakami et al. | |
| 2012/0303641 A1 | 11/2012 | Gudlavenkatasiva et al. | |
| 2013/0103663 A1* | 4/2013 | Evers | G06Q 10/10 |
| | | | 707/706 |
| 2013/0227352 A1 | 8/2013 | Kumarasamy et al. | |
| 2013/0332424 A1 | 12/2013 | Nos et al. | |
| 2014/0075004 A1* | 3/2014 | Van Dusen et al. | 709/223 |

OTHER PUBLICATIONS

Non-Final Office Action for U.S. Appl. No. 13/494,786, mailed Sep. 27, 2013, 23 pages.

* cited by examiner

BRAINSTORMING IN A CLOUD ENVIRONMENT

CROSS-REFERENCE TO RELATED APPLICATION

This application claims priority under 35 U.S.C. §119 to Chinese Patent Application No. 201210175201.6, filed on May 30, 2012, titled "BRAINSTORMING IN A CLOUD ENVIRONMENT", which is incorporated herein by reference in its entirety.

BACKGROUND

With respect to product innovation or daily management, brainstorming activities are becoming more and more important. Brainstorming may be considered a group or individual creativity technique by which efforts are made to find a conclusion for a specific problem by gathering a list of ideas contributed by its members. Although there are various types of specific techniques, in conventional brainstorming sessions, most people use sticky notes and a white board as tools to facilitate the collection and organization of ideas for a particular topic. In one example, the topic may be ideas to work more efficiently. As such, one or more members of the brainstorming session may contribute ideas (e.g., PowerPoint presentations, time lines, additional meeting rooms, etc.), which are written down on sticky notes, and then arranged into clusters (categories) on the white board. However, such mechanisms are inefficient and are limited to people in the same location having a large white board with sticky notes. Further, the ideas presented on the white board are typically not organized in a consistent manner, and it is relatively subjective and difficult to classify the ideas in an organized manner. Also, such a conventional mechanism makes it nearly impossible to have more than one version of the clusters, and require additional time for generating a summary for the brainstorming session. Further, such brainstorming sessions are typically not shared with different teams.

SUMMARY

Embodiments provide a cloud brainstorming service implemented on at least one cloud server. The brainstorming service includes a message service component configured to receive a plurality of ideas, over a network, from one or more users of devices. The users represent members of a brainstorming session. The brainstorming service also includes a brainstorming logic component configured to process the plurality of ideas and store the plurality of processed ideas in an in-memory database system, and a clustering component configured to retrieve the plurality of processed ideas from the in-memory database system and arrange the plurality of processed ideas into one or more clusters, where each cluster is a group of similar ideas. The message service component is configured to provide the plurality of processed ideas that are arranged into the one or more clusters, over the network, to the one or more users for display.

In one embodiment, the message service component may be configured to provide, over the network, an idea submission page to the one or more users for display in response to a new brainstorming event, where the idea submission page provides a template to permit the users to submit ideas. Also, the message service component may be configured to receive, over the network, the plurality of ideas from the one or more users after submission by the one or more users.

The message service component configured to provide an idea submission page to the one or more users for display in response to a new brainstorming event may include providing, over the network, a new brainstorming session template to a host of the brainstorming session. The host may be one of the users. The new brainstorming session template may provide brainstorming settings for selection by the host. The providing an idea submission page may also include receiving, over the network, the selected brainstorming settings including information identifying the members of the brainstorming session and providing, over the network, the idea submission page to each of the members.

The brainstorming logic component configured to process the plurality of ideas may include a duplication checker configured to detect duplicate ideas among the plurality of ideas and delete the detected duplicate ideas.

In one embodiment, the duplication checker may determine whether any synonyms exists for each word in each idea based on a reference dictionary stored in the in-memory database system, replace each word with an assigned word if a synonym exists for a corresponding word, calculate a similarity metric for each of the plurality of ideas, and detect a duplicate idea if two or more ideas have a similarity metric above a threshold value. Also, the duplication checker may merge duplicate ideas into a single idea while retaining submitter information for each of the users who submitted the duplicate ideas.

In one embodiment, the clustering component may select the plurality of processed ideas from the in-memory database system. Each idea may be a text string. Also, the clustering component may filter the selected plurality of processed ideas including parsing the plurality of processed ideas into word sets, removing stop words from each word set, extracting words from the word sets, and selecting feature words from the extracted words. Further, the clustering component may transform text data of the selected feature words into a plurality of vector space models (VSMs), and arrange the plurality of processed ideas into one or more clusters based on the plurality of VSMs.

The brainstorming logic component may include a manual adjuster configured to receive adjustment information, over the network, from a host of the brainstorming session and to adjust the one or more clusters based on the adjustment information including at least one of adding a new cluster, changing a name of the cluster, adjusting the ideas among the plurality of clusters, creating a new idea, and combining duplicate ideas.

The brainstorming logic component may include a summary generator configured to automatically generate a summary of the brainstorming session. The summary may include the plurality of ideas, cluster result information and voting result information. According to one aspect, the summary generator may be configured to provide the summary in an email communication, within a document for display, or a link to an internal portal.

The brainstorming logic component may include an idea voting component configured to receive voting information, over the network, from each of the members, and the message service component may be configured to provide, over the network, voting results information to be displayed with the plurality of ideas.

The in-memory database may be configured to store brainstorming topics, ideas, and results, and the brainstorming logic component may include a social share component configured to analyze relationships and similarities between each topic and idea. The message service component may be configured to provide a plurality of topics and ideas displayed according to their similarity.

The embodiments also provide a method for brainstorming performed by at least one or more processors. The method may include receiving a plurality of ideas, over a network, from one or more users of devices. The users may represent members of a brainstorming session. The method further includes processing the plurality of ideas and storing the plurality of processed ideas in an in-memory database system, retrieving the plurality of processed ideas from the in-memory database system and arranging the plurality of processed ideas into one or more clusters, each cluster being a group of similar ideas, and providing the plurality of processed ideas that are arranged into the one or more clusters, over the network, to the one or more users for display.

According to one embodiment, the receiving step may include providing, over the network, an idea submission page to the one or more users for display in response to a new brainstorming event, where the idea submission page provides a template to permit the users to submit ideas, and receiving, over the network, the plurality of ideas from the one or more users after submission by the one or more users.

The providing, over the network, an idea submission page to the one or more users for display in response to a new brainstorming event may include providing, over the network, a new brainstorming session template to a host of the brainstorming session. The host may be one of the users. The new brainstorming session template may provide brainstorming settings for selection by the host. The method may further include receiving, over the network, the selected brainstorming settings including information identifying the members of the brainstorming session and providing, over the network, the idea submission page to each of the members.

The processing the plurality of ideas may include detecting duplicate ideas among the plurality of ideas including determining whether any synonyms exists for each word in each idea based on a reference dictionary stored in the in-memory database system, replacing each word with an assigned word if a synonym exists for a corresponding word, calculating a similarity metric for each of the plurality of ideas and detecting a duplicate idea if two or more ideas have a similarity metric above a threshold value. The deleting the detected duplicate ideas may include merging duplicate ideas into a single idea while retaining submitter information for each of the users who submitted the duplicate ideas.

The method may further include selecting the plurality of processed ideas from the in-memory database system, where each idea may be a text string, and filtering the selected plurality of processed ideas including parsing the plurality of processed ideas into word sets, removing stop words from each word set, extracting words from the word sets, and selecting feature words from the extracted words. The method may further include transforming text data of the selected feature words into a plurality of vector space models (VSMs), and arranging the plurality of processed ideas into one or more clusters based on the plurality of VSMs.

The method may further include receiving adjustment information, over the network, from a host of the brainstorming session, and adjusting the one or more clusters based on the adjustment information including at least one of adding a new cluster, changing a name of the cluster, adjusting the ideas among the plurality of clusters, creating a new idea, and combining duplicate ideas.

The method may further include automatically generating a summary of the brainstorming session. The summary may include the plurality of ideas, cluster result information and voting result information.

The embodiments may provide a non-transitory computer-readable medium storing instructions that when executed cause one or more processors to perform a brainstorming process. The instructions comprising instructions to receive a plurality of ideas, over a network, from one or more users of devices, process the plurality of ideas and store the plurality of processed ideas in an in-memory database system, retrieve the plurality of processed ideas from the in-memory database system and arrange the plurality of processed ideas into one or more clusters, and provide the plurality of processed ideas that are arranged into the one or more clusters, over the network, to the one or more users for display.

The details of one or more implementations are set forth in the accompanying drawings and the description below. Other features will be apparent from the description and drawings, and from the claims.

DETAILED DESCRIPTION

Embodiments provide a cloud-based service for brainstorming, which allows people in different locations having access to the web or mobile device to participate in live brainstorming sessions. Among other features, the cloud brainstorming service provides an automatic clustering mechanism which automatically groups similar ideas, thereby allowing the host and participants to be more focused on the creation of ideas themselves, as opposed to organizing the submitted ideas, which may be relatively difficult if the brainstorming session includes a large number of participants. Further, the embodiments encompass the use of an in-memory database system, which permits the cluster results to be provided to the participants in real-time or near real-time. Further, the user has the option of adjusting the cluster results manually (e.g., adding a new cluster, changing a name of the cluster, adjusting the ideas among the plurality of clusters, creating a new idea, and combining duplicate ideas). Also, the cloud brainstorming service may encompasses a social share component, which allows users to view brainstorming sessions (e.g., topics, ideas) conducted by other groups or team members. The similar topics may be grouped together as well as similar ideas within each topic so that a user may easily browse brainstorming sessions, thereby reducing duplicate efforts.

According to one aspect, the cloud brainstorming service may provide a new brainstorming template over a network to a host of a brainstorming session after the host logs into the system and selects a new brainstorming session option. Then, the host is able to enter brainstorming settings such as the period of time when the brainstorming session is active, the participants (or members), a brief description of the session, and one or more topics for which ideas are solicited. Upon receiving the brainstorming settings, the cloud brainstorming service may provide an idea submission page to each of the participants. During the time period identified by the brainstorming settings, each participant may enter and submit his/her ideas for each identified topic, and the cloud brainstorming service is configured to de-duplicate redundant ideas, arrange the submitted ideas into one or more clusters (e.g., categories) and provide the clustered ideas over the network in real-time as each user submits his/her ideas. Although the participants are located in different locations, the clustered results may be displayed via a user interface that is common to each of the members so that each participant can view the submitted results as the ideas are populated. The ideas and clustered results may be stored in the in-memory database system, which allows for relatively quick processing and retrieval. These and other features are further explained with reference to the figures.

Figure 1:
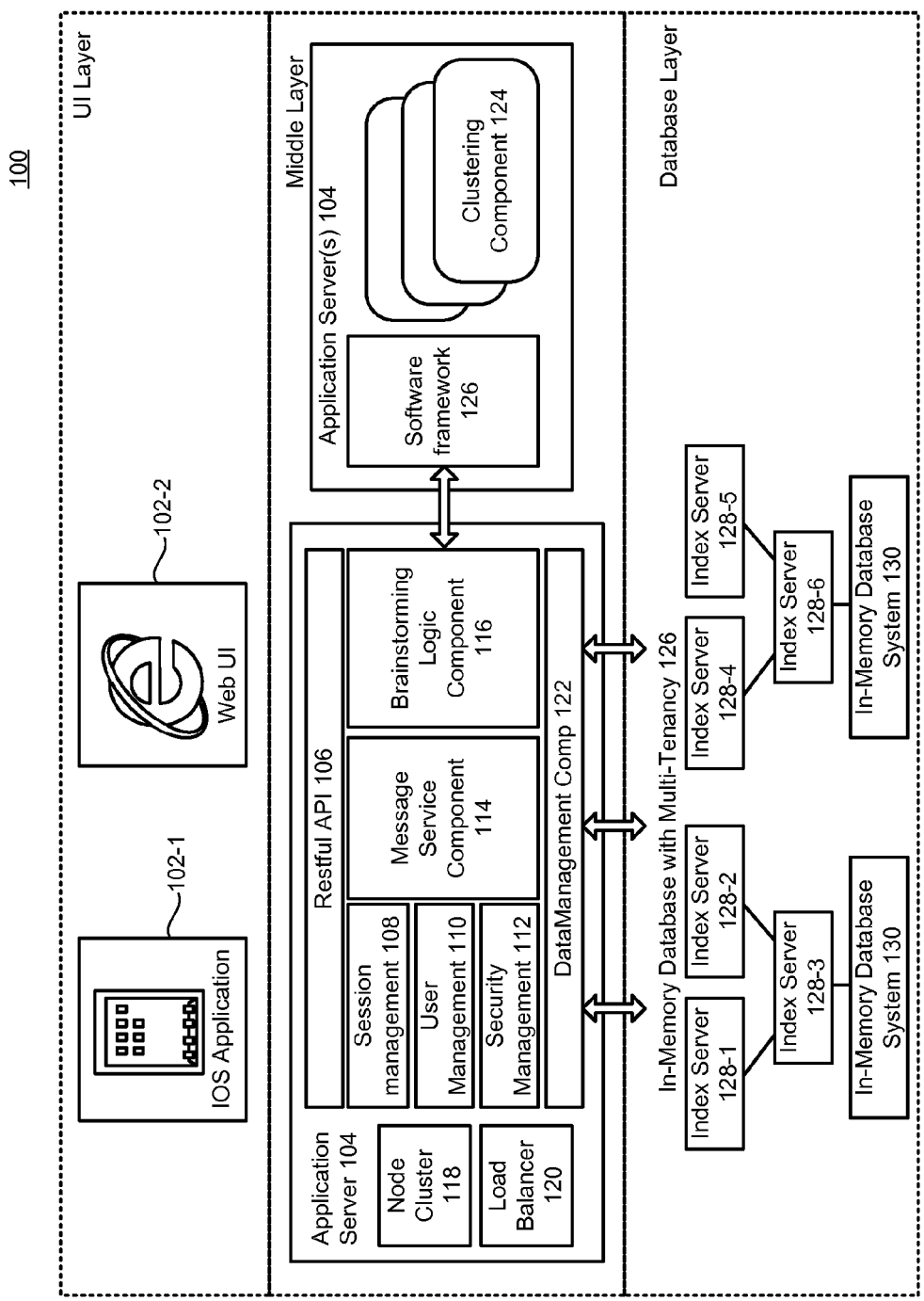
FIG. 1 illustrates a system for providing a cloud brainstorming service according to an embodiment.

FIG. 1 illustrates a system 100 for providing a cloud brainstorming service according to an embodiment. The system 100 may include a plurality of user devices 102, as shown in the user interface (UI) layer. A user may operate the device 102-1 or the device 102-1 to log into the system 100, and create/join a brainstorming session. The UI layer may be developed by Hyper Text Markup Language 5 (e.g., HTML5), and may be configured to operate in different types of browsers and platforms.

By way of non-limiting example, then, the devices 102 may include a laptop or desktop computer, a netbook, a tablet computer, a smartphone, a camera, or any device capable of accessing a network. As known, the devices 102 may include an application executing on an operating system such as the application illustrated with respect to device 102-1 and/or a web browser illustrated with respect to device 102-2. The application/web browser may include functionality that permits the devices 102 to communicate with the brainstorming cloud service located on application server 104. In this regard, the term "cloud" or "cloud-aware" references the use of "cloud computing," which, generally speaking, includes a style of computing in which computing resources such as application programs and file storage are remotely provided over a network such as the Internet, typically through the web browser. For example, many web browsers are capable of running applications, which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server (e.g., the application server 104) via the remote application program. Thus, it may be observed that the application server 104 and the devices 102 may also represent examples of cloud computing. The application associated with device 102-1 may be virtually any type of application capable of running on an operating system, and the web browser associated with device 102-2 may be any type of web browser known in the art.

Although only two devices 102 are illustrated in FIG. 1, the embodiments encompass any number of devices 102, thereby having a plurality of users who may be participants in the brainstorming session. Each device 102 may communicate with the application server 104 (in the middle layer) via a network. The network may be the public Internet or other wide area public or private network such as a corporate or other intranet, and/or a smaller-scale, local or personal network, any of which may be implemented using standard network technology.

In the middle layer, the application server 104 hosts the cloud brainstorming service. For example, the application server 104 may include an Application Programming Interface (API) 106, a session management unit 108, a user management unit 110, a security management unit 112, a message service component 114, a brainstorming logic component 116, a data management component 122, a software frame work 126, a clustering component 124 (e.g., the clustering component may be implemented in a distributed solution having a software framework 126), a node cluster 118, and a load balancer 120. The application server 104 may include other components that are well known to one of ordinary skill in the art. The application server 104 may communicate with the devices 102 via the API 106 (through the use of the message service component 114) and the application server 104 may communicate with the database layer via the data management component 122.

For example, the API 106 may represent the backend functional API(s) being exposed as a RESTful API, which is a web service implemented using Hypertext Transfer Protocol (HTTP) and principles of Representational state transfer (REST). The API 106 may permit communications between the application server 104 and each device 102. The data management component 122 manages all data operations which communicate with the database layer, which includes an in-memory database system with multi-tenancy 126. All of the data captured in the cloud brainstorming service may be stored in the in-memory multi-tenancy database system 126.

The in-memory multi-tenancy database system 126 may include a plurality of index servers 128 and one or more in-memory database systems 130. The in-memory database system 130 may be a type of database system that supports real-time analytics and transactional processing. For example, the in-memory database systems 130 may include a parallel processing data store that utilizes row-based, column-based, and/or object-based storage techniques. In one embodiment, the in-memory database systems 130 may be HANA Enterprise 1.0 (any other versions) that is developed by SAP.

The in-memory database systems 130 may be equipped with multi-tenancy mechanisms, thereby transforming the database system into the multi-tenancy in-memory database system 126. For example, each index server 128 may be associated with a different customer or tenant. In particular, a customer may be an enterprise such as a company, and the company may utilize the cloud brainstorming service provided by the application server 104 for facilitating brainstorming sessions within the company. Therefore, the company is associated with a dedicated index server that allows the brainstorming data of that company to be stored in the in-memory database system 130 in such a manner that the company's brainstorming data is separate from brainstorming data of other tenants or companies. As such, each index server 128 may be associated with its own storage volumes, transaction domain and virtual memory. Therefore, the data operating in each tenant environment would not affect the data stored in other tenant environments. Although FIG. 1 illustrates six index servers (e.g., first index server 128-1, second index server 128-2, third index server 128-3, fourth index server 128-4, fifth index server 128-5 and sixth index server 128-6), the embodiments encompass any number of index servers.

The session management unit 108 may be configured to manage the brainstorming session when a user logs into the system (e.g., entering a login ID, password combination). The session management unit 108 may generate a brainstorming session that includes the user's login information such as user's login name, password, as well as other basic information, and any relevant authorizations. Also, the session management unit 108 may track user activities in the system 100 such as if the brainstorming session is not authenticated or the session has expired, as well as the brainstorming session time period.

The user management unit 110 may be configured to manage user information, user registrations, user authorization settings, and any type of user hierarchy settings. The user management unit 110 may be employed as a multi-tenancy system having a plurality of separate databases that stores each of the various types of user information. Also, the user management unit 110 may be configured to register each user and/or device 102 who may wish to use the cloud brainstorming service, and to store identification information from such users within its database. For example, the user management unit 110 may provide a registration page over network in order to allow a particular user register with the cloud brainstorming service. Upon entering the relevant information, the user management unit 110 may register the user based on the registration information received over the network from the user and store the identification information along with any other type of user information within its database. However, there are many example scenarios and techniques by wish user and/or devices 102 may come to be registered with the cloud brainstorming service through the user management 110. The security management unit 112 may be configured to cooperate with the session management unit 108 and the user management unit 110 to handle all security check rules and authorizations checks.

The message service component 114 may be configured to manage all exchanged messages between the devices 102 and the application server 104. For instance, the message service component 114 may be configured to coordinate all messages from the host to the participants (and vice versa), as well as update the brainstorming session pages in a real-time or near real-time manner so that each of the participants have relatively immediate access to the progress of the brainstorming session. For example, brainstorming is a team activity and involves one host and many other participants. In some cases, the participants may be in different locations and cannot communicate with each other face to face. As such, the message service component 114 may synchronize all the information and operations between the devices 102 such that the participants can share the same screen and stand in the same page for better understanding and communication.

For example, when a user (the host) wishes to create a new brainstorming session, the message service component 114 may provide, over the network, a new brainstorming session template to the host of the brainstorming session. The new brainstorming session template may provide brainstorming settings for selection by the host. For example, the brainstorming settings may include the subject of the brainstorming session, the participants, the time period, a brief description of the brainstorming session, and one or more topics to be discussed in which ideas are solicited from the identified members. The new brainstorming session template is further described later in the disclosure with respect to FIG. 7.

Thereafter, the message service component 114 may receive the new brainstorming information over the network from the host, and provide an idea submission page to the identified participants. For example, the idea submission page permits each participant to enter his/her ideas for each of the topics identified by the host in the new brainstorming session template. The idea submission page is further described later in the disclosure with respect to FIG. 8. When a particular user submits his/her ideas, the brainstorming logic component 116 and/or the clustering component 124 may perform one or more processes on the submitted ideas such as de-duplicating ideas and arranging the ideas into clusters (as further explained below), and the message service component 114 may provide the de-duplicated ideas (or processed ideas) that are arranged into the clusters, over the network, to the particular participant. Thereafter, after each participant submits his/her ideas, the same process is repeated, and the message service component 114 automatically updates the results for each of the participants.

More generally, the message service component 114 provides interactions among the cloud brainstorming service, the host and each of the other participants such that the participants can collaborate on the ideas and topics during the brainstorming meeting and can see each other participants' ideas as well as the clustering results immediately via the message service component 114. To realize this, the embodiments encompass a HTTP/HTTPS protocol. The HTTP/HTTPS protocol may permit the passage of messages through most proxies and firewalls such that the brainstorming session will not be affected by the network topology. Also, the embodiments encompass the use of Comet technology based on HTTP/HTTPS in order to permit the devices 102 to receive push notifications about the others' operations. As a result, the users of the devices 102 do not need to refresh the display screen (time by time time) to view the updated results. In addition, each of the participants may be able to vote for the top ideas for a particular topic. Therefore, the message service component 114 may also provide the voting results immediately for display as the voting information is received from each of the participants using the same mechanisms.

The brainstorming logic component 116 may be configured to handle the core logic of the system 100 such as data collecting, duplication check, social share and/or manual adjustment of the clusters. The details of the brainstorming logic component 116 are further illustrated in FIG. 2, which is explained later in the disclosure.

The clustering component 124 may be configured to retrieve the submitted ideas (which may have already been de-duplicated) from the in-memory database system 130 and arrange the submitted ideas into one or more clusters, where each cluster is a group of similar ideas. For example, for a particular brainstorming topic such as "working efficiently," the submitted ideas may include face-to-face conversion (as opposed to teleconferences), no overtime meetings, less PowerPoint presentations, more meeting rooms, faster and more stable network, second large LED screen, headset for phone, increases in salary, timeliness, and using cloud brainstorming service, for example. The clustering component 124 may be configured to automatically arrange these ideas into one or more clusters or categories. In one example, the clusters may be "communication," "facility" and "miscellaneous." As such, the clustering component 124 may arrange the following ideas into the "communication" cluster: face-to-face conversion, no overtime meetings, and less PowerPoint presentations, for example. Also, the clustering component 124 may arrange the following ideas into the "facility" cluster: more meeting rooms, faster and more stable network, second large LED screen and headset for phone, for example. Further, the clustering component 124 may arrange the following ideas into the "miscellaneous" cluster: increases in salary, timeliness, and use of cloud brainstorming service, for example. Not only may the clustering component 124 arranged the submitted ideas into one or more clusters, but also the clustering component 124 may determine the name associated with each cluster (e.g., communication, facility, and miscellaneous). In one embodiment, the clustering component 124 may use support vector classification to implement the clustering mechanism. The clustering component 124 may utilize a vector model based on training data in order to parse the sentence of the idea and automatically assign it to the appropriate category, which is further explained below.

Because the clustering component 124 may consume a relatively large amount of resources, the embodiments encompass a distributed computing solution to use one or more isolated hosts to process the clustering steps in parallel. As such, in order to accomplish the distributed computing solution, the embodiments encompass any type of software framework 126 such as a HADOOP distributed file system, which is known to one of ordinary skill in the art. Because the clustering component 124 may be implemented in a distributed computing solution, the clustering component 124 may perform the clustering operations across a number of application servers 104. Alternatively, the clustering component 124 does not necessarily have to be implemented using a distributed computing solution, where the clustering logic may be implemented on the application server 104 associated with the brainstorming logic component 116, message service component 114, and the other components associated with the cloud brainstorming service.

In addition, the clustering component 124 may be pushed into the in-memory database system level. For example, as indicated above, the in-memory database systems 130 may have the capabilities of transactional and analytical processing. As such, the in-memory database stations 130 may include one or more processing units for carrying out such operations. Therefore, the embodiments encompass the situation where the clustering component 124 is located within the in-memory database systems 130, and the clustering results are provided to the participants via the message service component 114 in conjunction with the API 106.

After the clustering component 124 arranges the submitted ideas into the one or more clusters, the message server component 114 may provide the submitted ideas which are arranged into the one or more clusters over the network to the participants for display via a display screen that is common to each of the participants. Also, the clustering component 124 may store the cluster results in the in-memory database system 130. The details of the clustering operating are further detailed with respect to FIG. 5 of the disclosure.

According to one embodiment, in order to improve the scalability and availability of the application server 104, the node cluster 118 may be configured to balance the clustering operations throughout the number of application servers 104 when the clustering operating is implemented in a distributed solution. In particular, one application server 104 may include a cluster management node as a master application server. The other application servers 104 may be configured as slave servers, which may be centrally managed by the cluster management node. The cluster management node may dispatch the user requests to the appropriate application servers 104 based on configured algorithms such as round-robin, response-time, least-loaded, and/or weighted, for example. Also, the system 100 may include a load balancer 120 that may be configured to balance the loading across the number of application servers 104 according to methods that are well known to one of ordinary skill in the art.

Figure 2:
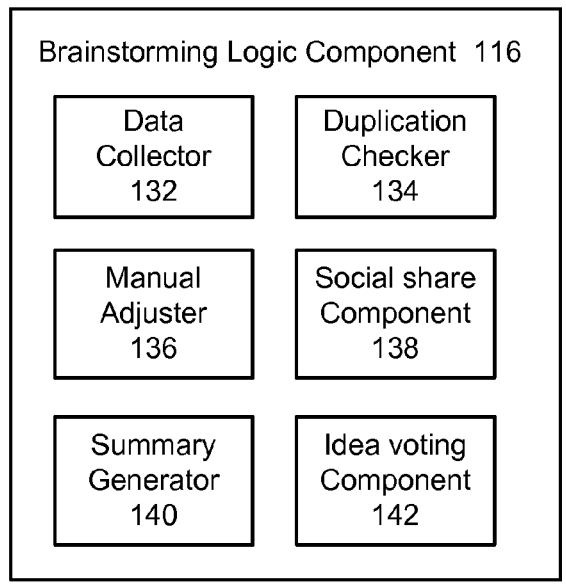
FIG. 2 illustrates a brainstorming logic component of the system of FIG. 1 according to an embodiment.

FIG. 2 illustrates the brainstorming logic component 116 according to an embodiment. Referring to FIG. 2, the brainstorming logic component 116 may include a data collector 132, a duplication checker 134, a manual adjuster 136, a social share component 138, a summary generator 140, and an idea voting component 142.

The data collector 132 may be configured to collect the submitted ideas via one or more different communication channels from the devices 102 over the network. For example, as indicated, each member of the brainstorming session may submit his/her ideas via the idea submission page. As such, the message service component 114 may receive the plurality of ideas over the network from the users. The data collector 132 may collect the submitted ideas and store the ideas in the in-memory database system 130. In particular, the data collector 132 may store original submitted ideas and processed ideas in different tables in the in-memory database system 130. Further, the data collector 132 may store submission information associated with each of the submitted ideas in the in-memory database system 130 such as user information and time of submission. Because the in-memory database system 130 may already support a number of parallel sessions, the data collector 130 may directly store the submitted ideas and the submission information directly in the in-memory database system 130. Alternatively, the data collector 130 may utilize data collection techniques such as data synchronizations tools, data services, and/or extract, transform, and load (ETL) mechanisms.

The duplication checker 134 may be configured to detect duplicate ideas among the plurality of submitted ideas and delete the detected duplicate ideas. For example, in the brainstorming sessions, users may be encouraged to submit as many ideas as possible. As such, there may be a number of duplicate ideas, which do not have to be independently stored in the in-memory database system 130. As such, the duplication checker 134 may be configured to detect duplicate ideas, and delete the duplicate ideas such that duplicate ideas are not presented to the participants and/or stored in the in-memory database system 130. According to an embodiment, the duplication checker 134 may be configured to determine whether any synonyms exit for each word in each idea based on a dictionary stored in the in-memory database system 130. The duplication checker 134 may be configured to replace each word with an assigned word if a synonym exits for a corresponding word. Thereafter, the duplication checker 134 may calculate a similarity metric for each of the plurality of ideas, and detect a duplicate idea if two or more ideas have a similarity metric above a threshold value. The details of the duplication checker 134 are further illustrated in FIG. 4, which is explained later in the disclosure.

The manual adjuster 136 may be configured to receive adjustment information over the network, from a host (or possibly another participant) of the brainstorming session, and adjust the clusters based on the adjustment information including adding a new cluster, changing a name of the clusters, adjusting the ideas among the clusters, creating a new idea, and/or combining duplicate ideas. For example, upon reviewing the arrangement of the ideas into the clusters, a user may decide to change the name of one or more clusters, add a new cluster, create a new idea, or combine duplicate ideas (which were not detected by the duplication checker 134). In such a case, the manual adjuster 136 may receive the adjustment information reflecting the above-described functions, and adjust the clustering results accordingly. In other words, the user can change the idea-cluster relationship, add a new cluster, or move an idea into a different cluster. The manual adjustment may be marked in the in-memory database system 130 as one of the idea's attributes so that further automatic clustering/duplication check will not make any changes on the manual adjustment result.

The social share component 138 may be configured to analyze relationships and similarities between each topic and idea for all or most brainstorming sessions. For example, the in-memory database system 130 may be configured to store brainstorming topics, ideas, and results for a number of brainstorming sessions. In other words, the in-memory database 130 stores information for all the brainstorming sessions related to a certain enterprise. According to one aspect, a user of the cloud brainstorming session may enter a social share page, which may provide a plurality of topics and a plurality of ideas for each topic, and arrange similar topics into groups. Further, the user may be able to select a particular topic within the group, and the user is presented with the top ideas related to that particular topic (or all the ideas). The social share component 138 may use the same clustering mechanism to check the similarity between topics. As such, users can use this function to check whether there are similar ideas or topics which are already discussed by other teams before or after the brainstorming meeting, as well as browse the top ideas they are discussing.

The summary generator 140 may be configured to automatically generate a summary of the brainstorming session. For example, by using the cloud brainstorming service, the brainstorming session information is stored and managed in the in-memory database system 130. As such, the summary generator 140 may access this information such as the topics, ideas, cluster results, participant information, session information (e.g., date, period of time), voting results information, and generate a summary report that includes one or more of these types of information. Upon selection by the user, the summary generator 140 may generate a summary report, and provide the generated summary to the requested user. In one embodiment, the summary generator 140 may generate a portable document format (PDF) document or WORD version, and transmit the document via a linked email system. Also, the summary report may be included an email to the user. Alternatively, the summary report may be provided to the user on the user interface associated with the brainstorming session. In another embodiment, the summary generator 140 may be integrated with an internal portal associated with the company registered with the cloud brainstorming service. The summary itself may encompass virtually any type of format such as the list of top ideas, pie charts of ideas for each clusters, or any other type of arrangement having one or more the above-described brainstorming information.

The idea voting component 142 may be configured to receive voting information, over the network, from each of the members, and the message service component 114 may be configured to provide, over the network, voting results information to be displayed with the submitted ideas. For example, as indicated above, after the ideas are submitted to the cloud brainstorming service, the clustering component 124 arranges the submitted ideas into one or more clusters, and provides the arrangement of the ideas to each member of the brainstorming session. According to one embodiment, each participant of the brainstorming session may vote for the top ideas. As such, the idea voting component 142 may receive the voting information from each of the participants and rank the submitted ideas. Then, the message service component 114 may provide the voting results information over the network to be displayed with the arrangement of the submitted ideas.

Figure 3:
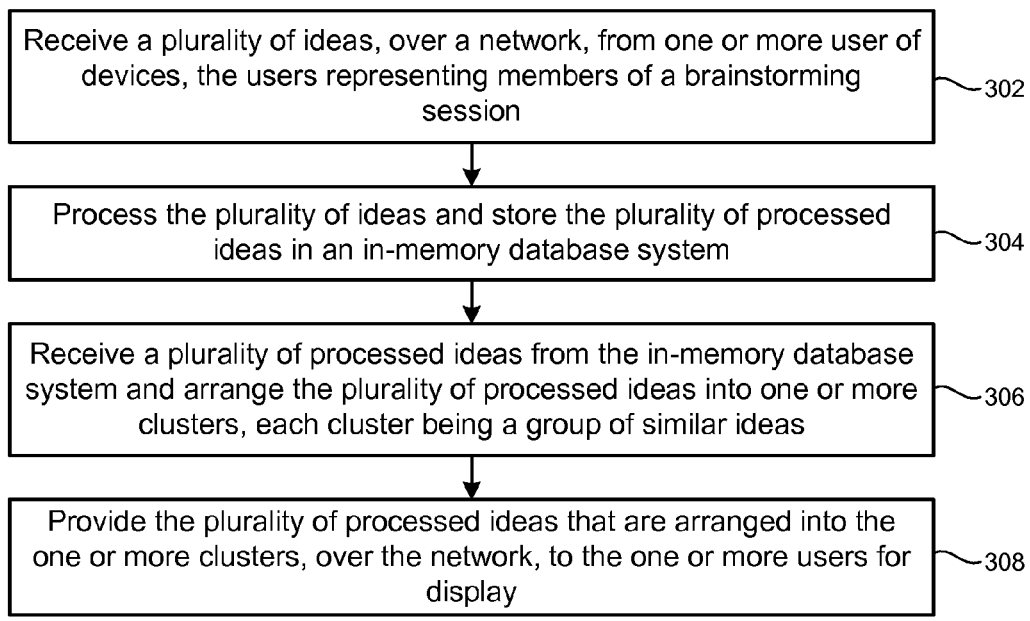
FIG. 3 is a flowchart illustrating example operations of the cloud brainstorming service using the system of FIG. 1 according to an embodiment.

FIG. 3 is a flowchart illustrating example operations of the cloud brainstorming service using the system 100 of FIG. 1 according to an embodiment. Although FIG. 3 is illustrated as a sequential, ordered listing of operations, it will be appreciated that some or all of the operations may occur in a different order, or in parallel, or iteratively, or may overlap in time.

A plurality of ideas may be received, over a network, from one or more users of devices, where the users represent members of a brainstorming session (302). For example, the message service component 114 may be configured to receive, over the network, from one or more users of the devices 102. In particular, when a user (the host) wishes to create a new brainstorming session, the message service component 114 may provide, over the network, a new brainstorming session template to the host of the brainstorming session. The new brainstorming session template may provide brainstorming settings for selection by the host. For example, the brainstorming settings may include the subject of the brainstorming session, the participants, the time period, a brief description of the brainstorming session, and one or more topics to be discussed in which ideas are solicited from the identified members. Thereafter, the message service component 114 may receive the brainstorming session settings via the new brainstorming session template, and then provide an idea submission page to the identified participants. For example, the idea submission page permits each participant to enter his/her ideas for each of the topics identified by the host in the new brainstorming session template. Then, the message service component 114 may receive, over the network, the plurality of ideas from the participants after the participants submits his/her ideas.

The plurality of ideas may be processed and stored in an in-memory database system (304). For example, the brainstorming logic component 116 may process the plurality of ideas and then store the processed plurality of ideas in the in-memory database system 130. In a further example, the data collector 132 may be configured to collect the submitted ideas via one or more different communication channels from the users of the devices 102. As indicated above, each member of the brainstorming session may submit their ideas via the idea submission page. As such, the message service component 114 may receive the plurality of ideas over the network from the users such as devices 102. The data collector 132 may collect the submitted ideas and store the ideas in the in-memory database system 130. Also, the system may process the plurality of ideas by using the duplication checker 134 that may be configured to detect duplicate ideas among the plurality of ideas and then delete the detected duplicate ideas. The deletion of duplicate ideas may include merging duplicate ideas into a single idea while retaining submitter information for each of the user who submitted duplicate ideas. According to an embodiment, the duplication checker 134 may be configured to determine whether any synonyms exits for each word in each idea based on a reference dictionary stored in the in-memory database system 130. The duplication checker 134 may be configured to replace each word with an assigned word if a synonym exits for a corresponding word. Thereafter, the duplication checker 134 may calculate a similarity metric for each of the plurality of ideas, and detect a duplicate idea if two or more ideas have a similarity metric above a threshold value.

A plurality of processed ideas may be received from the in-memory database, and the plurality of processed ideas may be arranged into one or more clusters, where each cluster is a group of similar ideas (306). For example, the clustering component 124 may be configured to retrieve the submitted ideas stored in the in-memory database system 130 and arrange the submitted ideas into one or more clusters, where each cluster is a group of similar ideas. The clustering component 124 may be configured to automatically arrange these ideas into one or more clusters or categories.

The plurality of processed ideas that are arranged into the one or more clusters may be provided, over the network, to the one or more users for display (308). For example, the message service component 114 may provide the ideas that are arranged into the clusters, over the network, to the one or more users for display. Further, according to another embodiment, a user may wish to adjust the results of the clustering operation. In such a case, the manual adjuster 136 may be configured to receive adjustment information over the network, from a host of the brainstorming session, and adjust the clusters based on the adjustment information including adding a new cluster, changing a name of the clusters, adjusting the ideas among the clusters, creating a new idea, and/or combining duplicate ideas. For example, upon reviewing the arrangement of the ideas into the clusters, the host may decide to change the name of one or more clusters, add a new cluster, create a new idea, or combine duplicate ideas. In such a case, the manual adjuster 136 may receive the adjustment information reflecting the above-described functions, and adjust the clustering results accordingly. In other words, the user can change the idea-cluster relationship, add a new cluster, or move an idea into a different cluster.

In addition, the host of the brainstorming session may permit voting on the best ideas within each topic. As such, the idea voting component 142 may be configured to receive voting information, over the network, from each of the members, and the message service component 114 may be configured to provide, over the network, voting results information to be displayed with the submitted ideas. For example, as indicated above, after the ideas are submitted to the cloud brainstorming service, the clustering component 124 arranges the submitted ideas into one or more clusters, and provides the arrangement of the ideas to each member of the brainstorming session. According to one embodiment, each participant of the brainstorming session may vote for the top ideas. As such, the idea voting component 142 may receive the voting information from each of the participants and rank the submitted ideas. Then, the message service component 114 may provide the voting results information over the network to be displayed with the arrangement of the submitted ideas.

Also, a user may wish to view a summary of the brainstorming session. As such, the summary generator 140 may be configured to automatically generate a summary of the brainstorming session. For example, by using the cloud brainstorming service, the brainstorming session information is stored and managed in the in-memory database system 130. As such, the summary generator 140 may access this information such as the topics, ideas, cluster results, participant information, session information (e.g., date, period of time), and generate a summary report. Upon selection by the user, the summary generator 140 may generate a summary report, and provide the generated summary to the requested user.

Figure 4:
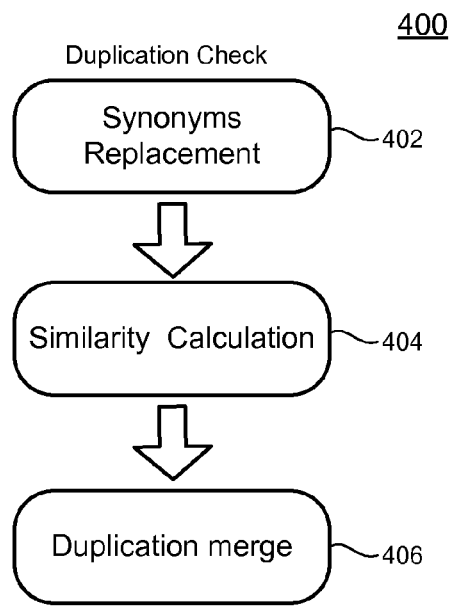
FIG. 4 is a flowchart illustrating example operations of a duplicate checker of the brainstorming logic component according to an embodiment.

FIG. 4 is a flowchart illustrating example operations of the duplicate checker 134 according to an embodiment. Although FIG. 4 is illustrated as a sequential, ordered listing of operations, it will be appreciated that some or all of the operations may occur in a different order, or in parallel, or iteratively, or may overlap in time.

Synonyms may be replaced (402). For example, the duplication checker 134 may be configured to determine whether any synonyms exit for each in each idea based on a reference dictionary stored in the in-memory database system 130. In particular, the in-memory database system 130 may store a relatively large reference dictionary. The duplication checker 134 may be configured to scan each word in each idea in order to check if any synonyms exit in the database. If synonyms are detected, the duplication checker 134 may be configured to replace the word with an assigned word. For example, the term "street", "St." or "road" may be all replaced by the term "street."

Similarities may be calculated (404). For example, the duplication checker 134 may calculate a similarity metric for each of the plurality of ideas, and detect a duplicate idea if two or more ideas have a similarity metric above a threshold value. In particular, the duplication checker 134 may utilize a similarity algorithm to calculate the similarities between all submitted ideas. The similarity algorithm may be the Levenshtein Distance algorithm, the Longest Common Substring (LCS) algorithm, or a combination of these algorithms. Basically, the duplication checker 134 calculates a similarity metric for each of the submitted ideas using the similarity algorithm, and then based on the similarity metric, the duplication checker 134 determines whether any of the ideas are duplicates based on the similarity metric being equal to or above a threshold value.

Duplicate ideas may be merged (406). For example, once duplicate ideas are detected, the duplication checker 134 may be configured to delete the duplicate ideas. In one embodiment, the duplication checker 134 may be configured to merge the duplicate ideas into a single idea while retaining submitter information for each of the participants who submitted the duplicate ideas. For example, the duplication checker 134 may be configured to collect the submitters' information related to the duplicate ideas from the in-memory database system 130, and then assign the submitter's information to the leading idea. Subsequently, the duplication checker 134 may be configured to remove all duplicates ideas except the leading ideas.

Figure 5:
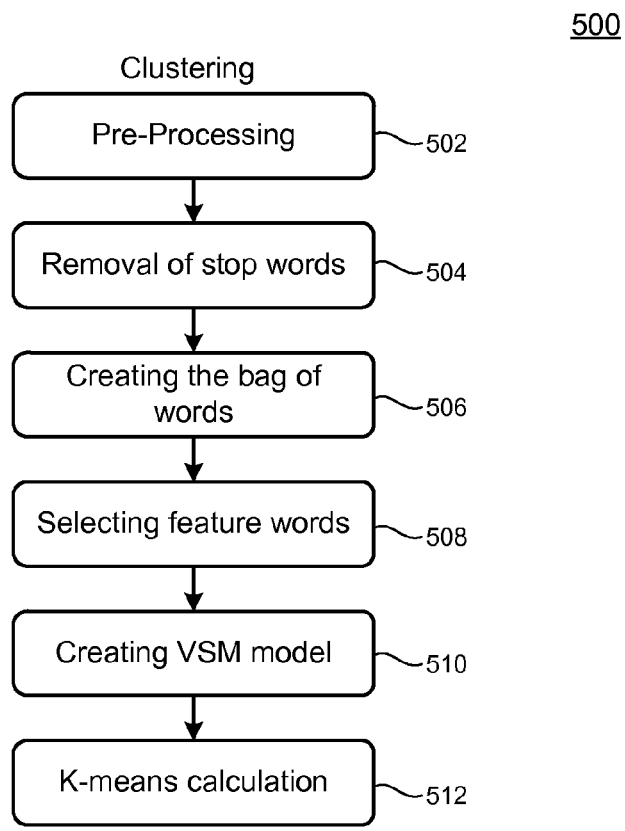
FIG. 5 is a flowchart illustrating example operations of a clustering component of the system of FIG. 1 according to an embodiment.

FIG. 5 is a flowchart illustrating example operations of the clustering component 124 according to an embodiment. Although FIG. 5 is illustrated as a sequential, ordered listing of operations, it will be appreciated that some or all of the operations may occur in a different order, or in parallel, or iteratively, or may overlap in time.

The submitted ideas may be pre-processed (502). For example, the clustering component 124 may retrieve the de-duplicated ideas from the in-memory database system 130 by applying one or more specific filters to the ideas. At this point, each idea is a text string, and the clustering component 124 may parse the de-duplicated ideas using a word separating process in order to generate word sets.

Stop words may be removed (504). For example, the clustering component 124 may be configured to remove stop words from each word set. Stop words may be referred to as filter words such as "is", "a", "the", etc., which are essentially meaningless and not relatively helpful for the clustering operation.

Bag of words may be created (506). For example, the clustering component 124 may be configured to extract words from the word sets. In particular, the words in the word sets are still in the original sequence before creating the bag of words. Thus, the clustering component 124 may be configured to analyse and extract the words from the word sets and remove the sequence. The result of performing such an analysis and extraction are referred to as a bag of words model. The clustering component 124 may utilize an SCPCD algorithm, or any other known technique for creating a bag words from a set of word sets.

Feature words may be selected from the bag of words (508). For example, the clustering component 124 may be configured to select one or more feature words from the extracted words (e.g., the bag of words). Feature words may be an important attribute for a bag of words. According to one embodiment, the clustering component 124 may utilize any type of DF algorithm in order to carry out the feature words selection.

VSMs models may be created (510). For example, the clustering component 124 may be configured to transform text data of the selected feature words into a plurality of vector space models (VSMs). In particular, the clustering component 124 may be configured to model the feature words using the VSMSs for text analytics. A python based procedure may be instituted to loop the processed word sets and transform them into the VSM model.

A K-means calculation may be performed (512). For example, the clustering component 124 may be configured to arrange the plurality of processed ideas into one or more clusters based on the plurality of VSMs. One approach is the K-means simulator. If the clustering component 124 utilizes the K-means simulator, the clustering component 124 may first calculate the center point of all automatically generated clusters. Then, the clustering component 124 may calculate the distance from each VSM to its respective center point. As a result, the clustering component 124 may assign the idea corresponding to the VSM that is closest to the cluster.

Figure 6:
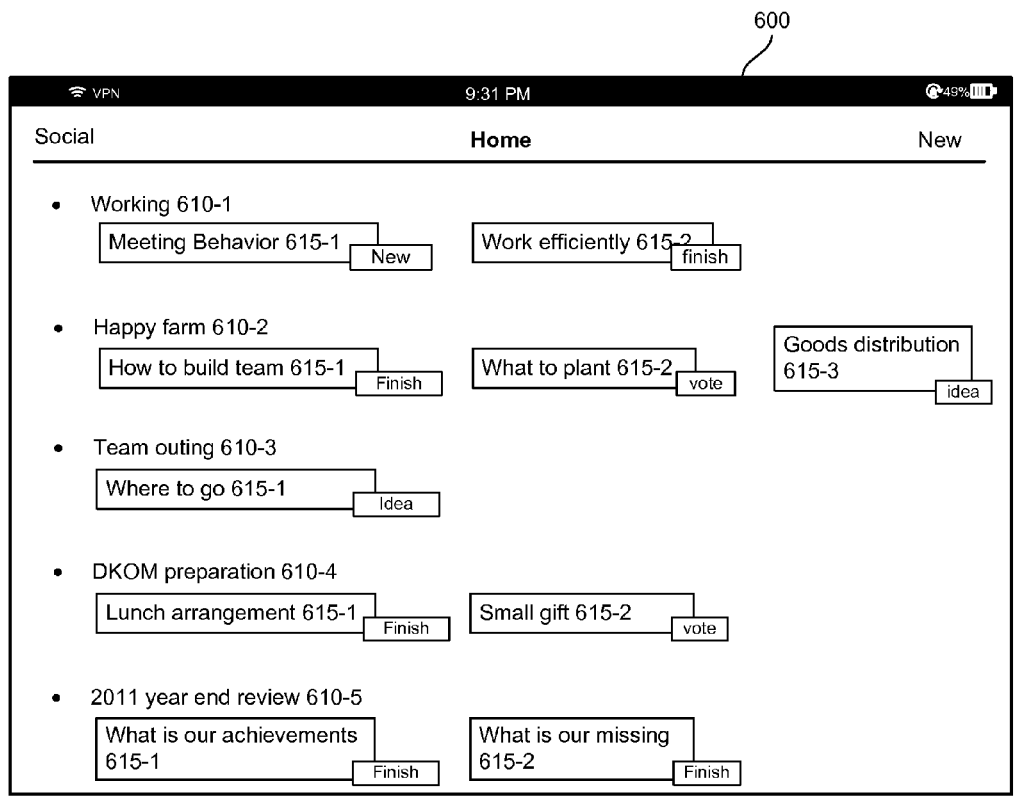
FIG. 6 illustrates a screenshot depicting a home page providing an overview of existing brainstorming sessions according to an embodiment.

FIGS. 6-12 illustrate various screens shots of the cloud brainstorming service according to an embodiment. For example, FIG. 6 illustrates a home page 600 providing an overview of all existing brainstorming sessions. For example, the home page 600 may be a home page for a particular user of the cloud brainstorming service. As show in FIG. 6, the home page 600 provides a plurality of existing brainstorming sessions 610, where each brainstorming session 610 may include one or more topics 615. With respect to each topic, the home page 600 may indicate a status of the brainstorming session—new, idea, finish, or vote. The term "new" may indicate that the topic is relatively new such as topic 615-1 under brainstorming session 610-1. In other words, the term "new" may indicate that a particular topic has recently been presented for the submission of ideas. The term "idea" may indicate that the user may have already viewed the topic, but still needs to submit his/her ideas such as topic 615-3 under brainstorming session 610-2. The term "finish" may indicate that the user has submitted his/her ideas as well as the voting information that indicates the user's preferred rank of ideas. The term "vote" may indicate that the user still must submit his/her voting information related to the top such as topic 615-2 under brainstorming session 610-2, for example.

Figure 7:
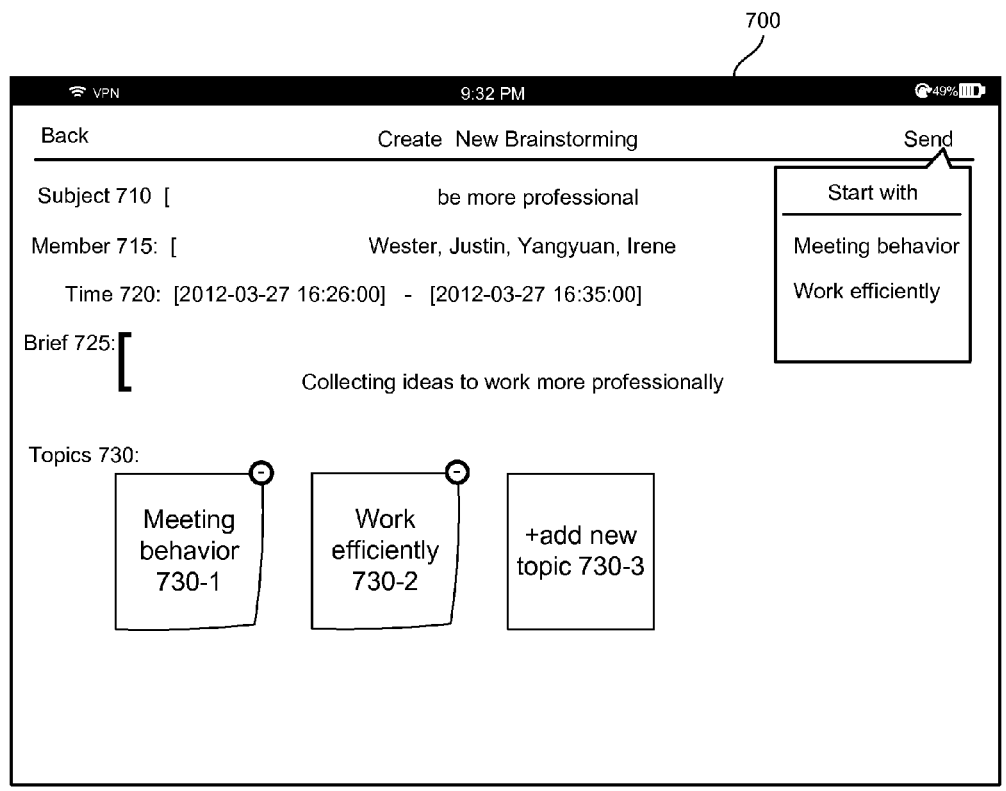
FIG. 7 illustrates a new brainstorming session template according to an embodiment.

FIG. 7 illustrates a new brainstorming session template 700 according to an embodiment. For example, when a user (the host) wishes to create a new brainstorming session, the message service component 114 may provide, over the network, the new brainstorming session template 700 to the host of the brainstorming session. The new brainstorming session template 700 may provide brainstorming settings for selection by the host. For example, the brainstorming settings may include the subject 710 of the brainstorming session, the participants 715, the time period 720, a brief description 725 of the brainstorming session, and one or more topics 730 to be discussed in which ideas are solicited from the identified members 715. Upon completing of the brainstorming session template 700, the host may select the send selection, which the message service component 114 may receive, over the network, the selected brainstorming settings. In response, the message service component 114 may provide, over the network, an idea submission page to each of the members 715, as further shown in FIG. 8.

Figure 8:
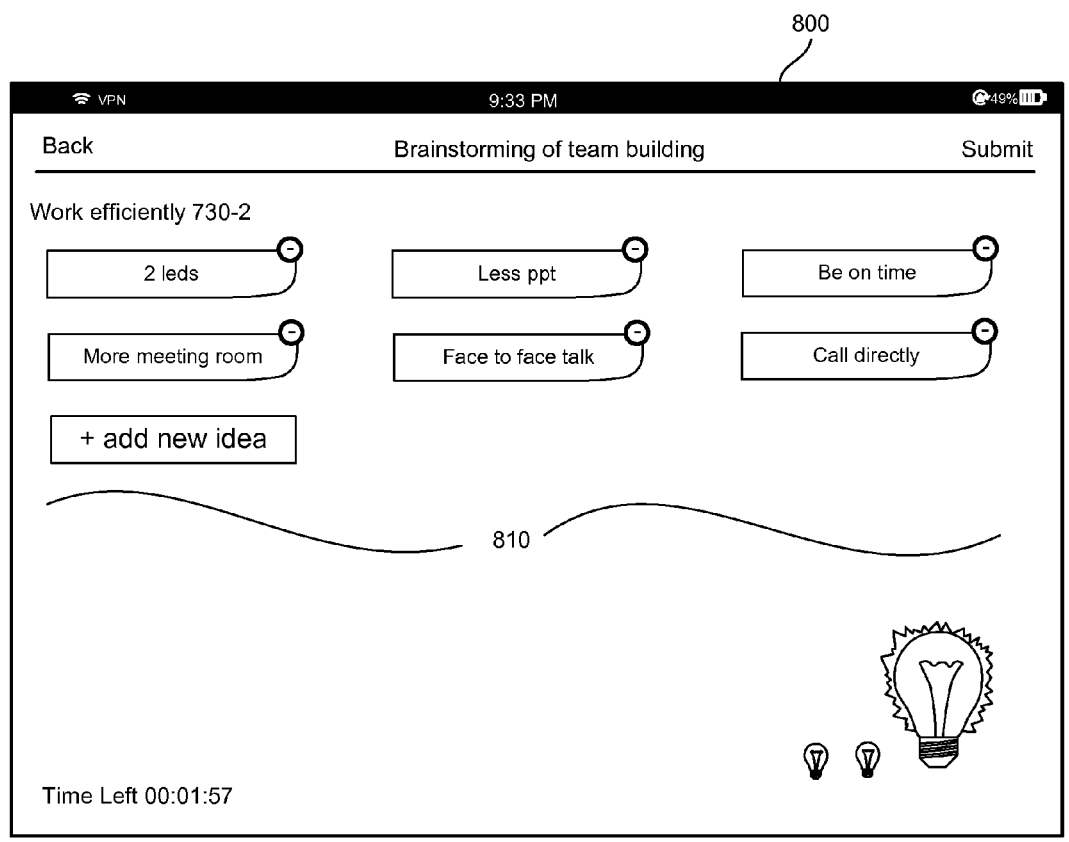
FIG. 8 illustrates an idea submission page according to an embodiment.

FIG. 8 illustrates an idea submission page 800 according to an embodiment. In the example of FIG. 8, the idea submission page 800 relates to topic 730-2. In this case, the user has entered ideas 810 related to this topic. Upon completing the number of ideas the user wishes to submit, the user may select the submit selection in order to send the ideas to the cloud brainstorming service. As such, the message service component 114 may be configured to receive the ideas related to this topic, over the network, from the user. The other members of this brainstorming session would submit their ideas in the same manner. As a result, the message service component 114 receives a plurality of ideas, over the network, from the members of the brainstorming session.

When all the ideas are submitted, the duplication checker 134 may detect duplicate ideas and merge the duplicate ideas while retraining the submitter information, as previously described above. Next, the clustering component 124 may arrange the plurality of de-duplicated ideas into one or more clusters in the manner previously described. As a result, the message service component 114 may provide, over the network, the plurality of de-duplicated ideas that are arranged into the one or more clusters to the members for display.

Figure 9:
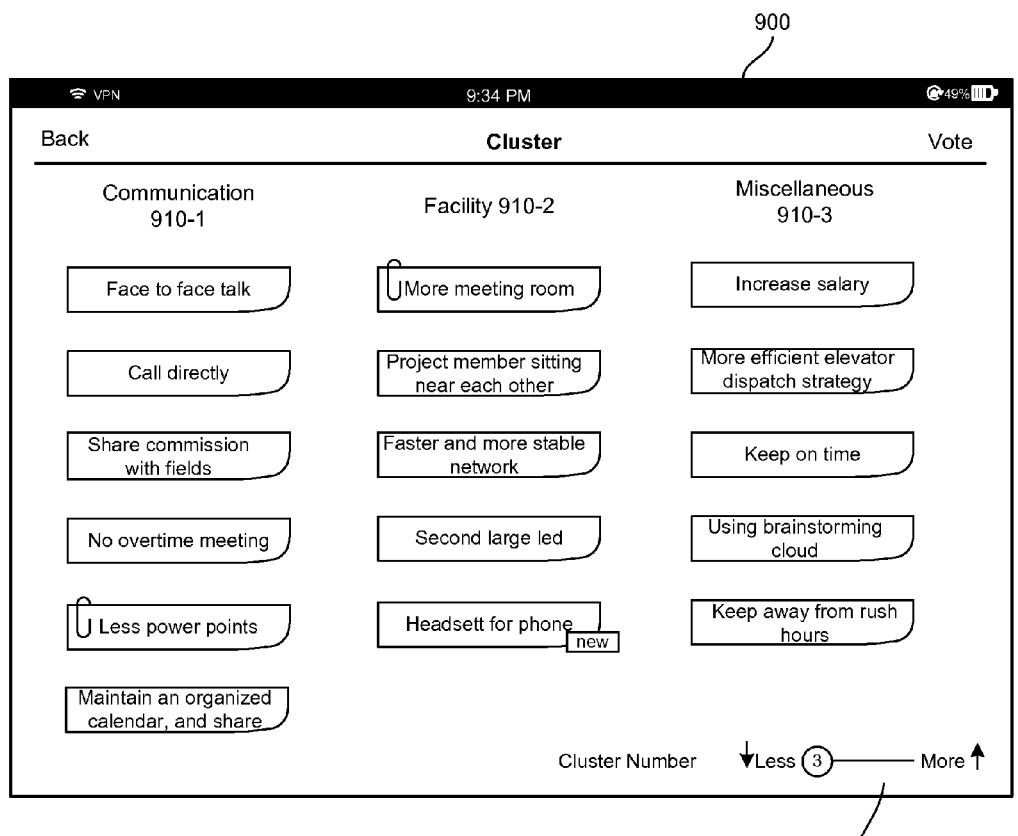
FIG. 9 illustrates a screenshot providing cluster results according to an embodiment.

FIG. 9 illustrates a screenshot 900 providing the cluster results according to an embodiment. For example, the screenshot 900 provides the arrangement of the plurality of ideas into the clusters such as the first cluster 910-1 (e.g., communication), the second cluster 910-2 (e.g., facility 910-2) and the third cluster 910-3 (e.g., miscellaneous). The term "new" indicates that an idea has recently been received. Also, the screen shot 900 provides a user control 915 for manually adjusting the number of clusters. For example, by operating the user control 915, the user can define the quantity of clusters, and the clustering component 124 will re-clusters the ideas automatically. Also, the user can manually modify the cluster result such as creating a new cluster, changing the cluster of a particular idea (e.g., move an idea from one cluster and place it into another cluster), create a new idea, and/or combine duplicate ideas. In one embodiment, the manual adjuster 136 may be configured to receive adjustment information over the network, from a host of the brainstorming session, and adjust the clusters based on the adjustment information including adding a new cluster, changing a name of the clusters, adjusting the ideas among the clusters, creating a new idea, and/or combining duplicate ideas.

Figure 10:
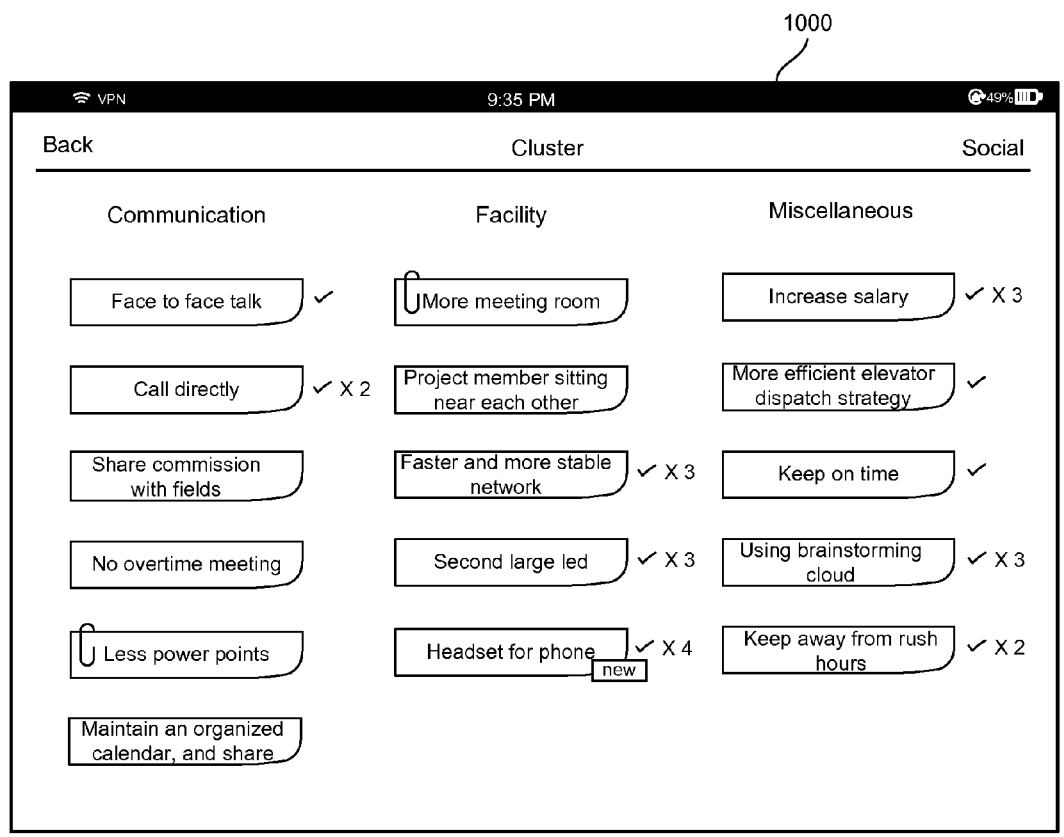
FIG. 10 illustrates a screenshot depicting the voting results according to an embodiment.

With respect to voting mechanism, the host can specify the quantity for each participant to vote, and, when a user completes his/her turn, the user may be able to see the overall voting status, as provided in FIG. 10. FIG. 10 illustrates a screenshot 1000 depicting the voting results according to an embodiment. The voting results may be provided in real-time or near real-time. For example, the idea voting component 142 may be configured to receive voting information, over the network, from each of the members, and the message service component 114 may be configured to provide, over the network, voting results information to be displayed with the submitted ideas. As shown in FIG. 10, the screenshot 1000 includes information indicating the amount of votes casts for each idea.

Figure 11:
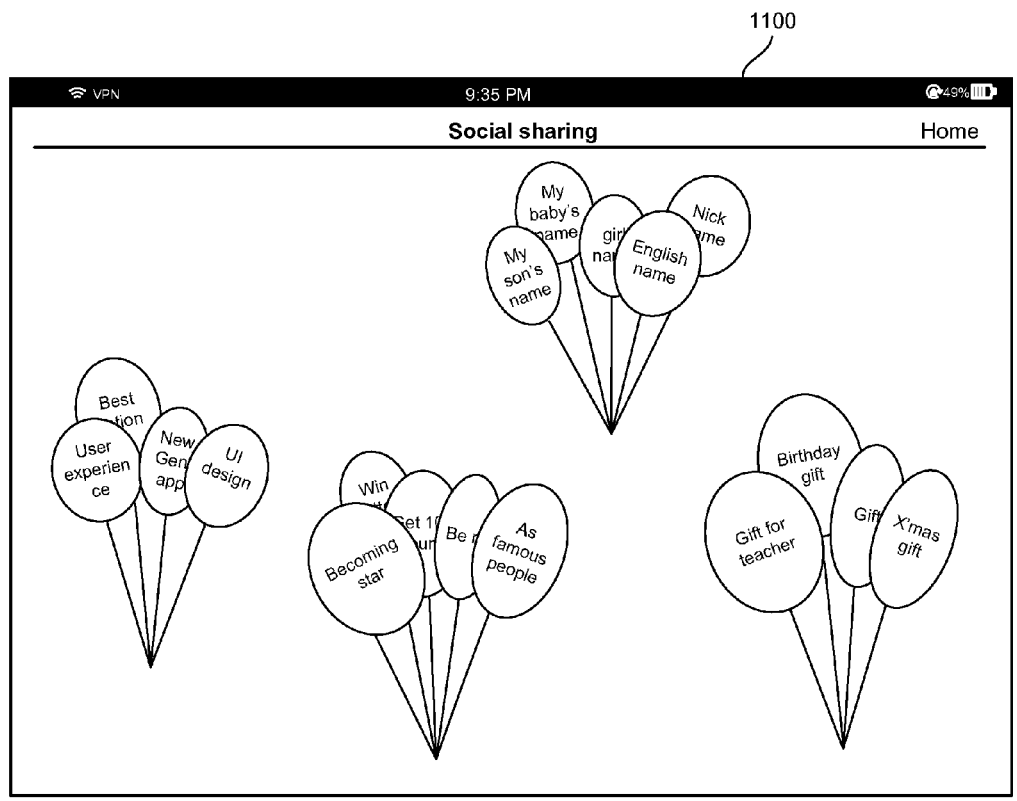
FIG. 11 illustrates a screenshot depicting a social share aspect according to an embodiment.

FIG. 11 illustrates a screenshot 1100 depicting the social share aspect according to an embodiment. For example, the social share component 138 may be configured to analyze relationships and similarities between each topic and idea for all the topics and ideas submitted through the cloud brainstorming service. For example, the in-memory database system 130 may be configured to store brainstorming topics, ideas, and results for a number of brainstorming sessions. In other words, the in-memory database 130 stores information for all the brainstorming sessions related to a certain enterprise. According to one aspect, a user of the cloud brainstorming session may enter a social share page as illustrated in FIG. 1100, which may provide a plurality of topics and a plurality of ideas for each topic. As shown in FIG. 11, the topics are arranged into groups, where each group includes a set of similar topics. For instance, one group of topics relates to gifts and another group of topics relates to baby names. Although only four groups of topics are illustrated in FIG. 11, the embodiments encompass any number of groups. The social share component 138 may use the same clustering mechanism to check the similarity between topics. As such, users can use this function to check whether there are similar topics which are already discussed by other teams before or after the brainstorming meeting, as well as browse the top ideas they are discussing. For example, the user may be able to drill-down into the ideas for each of the topics, as shown in FIG. 12.

Figure 12:
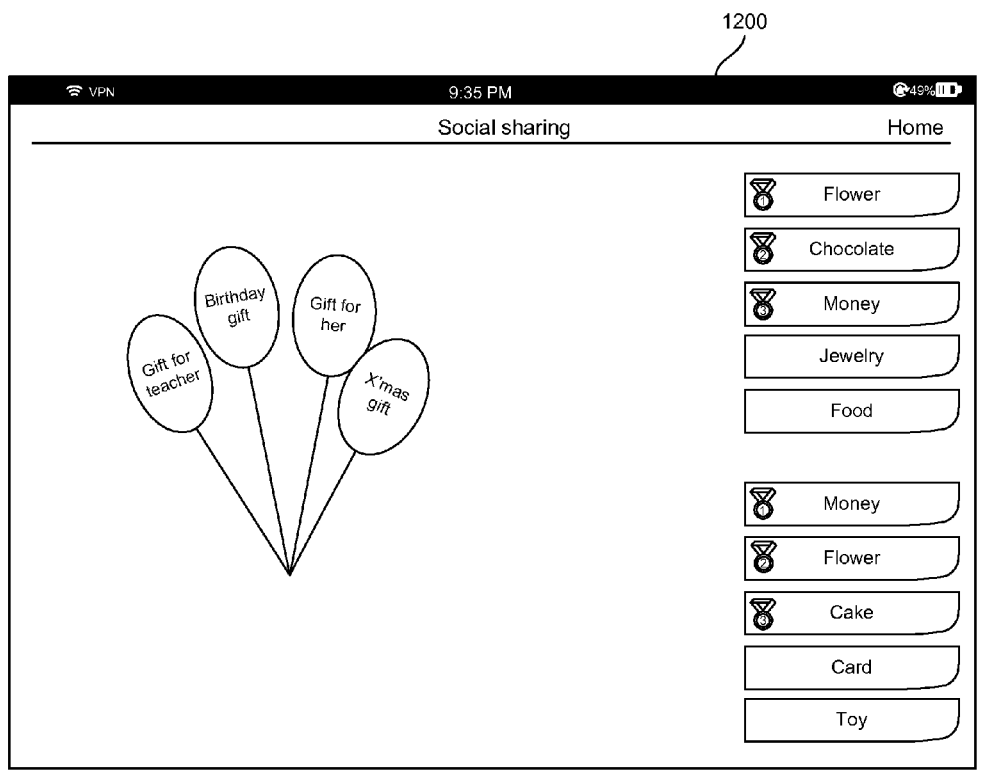
FIG. 12 illustrates a screenshot depicting ideas in a topic group according to an embodiment.

FIG. 12 illustrates a screenshot 1200 depicting ideas in a topic group according to an embodiment. For example, after the user selects a group, the social share component 138 may provide the top five ideas for the topic group, and/or each topic. As shown on the right side of FIG. 12, the top five ideas are presented for the first two topics (e.g., gift for teacher, birthday gift) along with information indicating the ranking of the ideas (e.g., $1^{st}$, $2^{nd}$, $3^{rd}$). The user may adjust the screenshot 1200 by scrolling in order to review the other top ideas for the other two topics. Although the top five ideas are presented in the example of FIG. 12, the embodiments encompass any number of ideas to be displayed within the social sharing screenshot 1200. As a result, users are able to share their brainstorming session with other users, and also browse other brainstorming sessions. Also, the social share component 138 may recognize the text of all brainstorming topics, group similar topics together, and generate the top N most important ideas of these groups such that the users are able to understand the overall discussion results for his/her interested topics.

For example, as indicated above, after the ideas are submitted to the cloud brainstorming service, the clustering component 124 arranges the submitted ideas into one or more clusters, and provides the arrangement of the ideas to each member of the brainstorming session. According to one embodiment, each participant of the brainstorming session may vote for the top ideas. As such, the idea voting component 142 may receive the voting information from each of the participants and rank the submitted ideas. Then, the message service component 114 may provide the voting results information over the network to be displayed with the arrangement of the submitted ideas.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for using a cloud brainstorming service performed by at least one or more processors, the method comprising:
   receiving, at the cloud brainstorming service implemented on one or more application servers, a plurality of ideas, over a network, from users of devices, the users representing members of a brainstorming session;
   de-duplicating the plurality of ideas at the cloud brainstorming service;
   storing the plurality of ideas in an in-memory database system using an index server, the in-memory database system being a database system that uses main memory for computer data storage;
   grouping the plurality of ideas into clusters using a clustering component implemented as a distributed computing solution across multiple application servers including retrieving the plurality of ideas from the in-memory database system, automatically arranging the plurality of ideas into the clusters, and automatically determining a category name for each cluster, each cluster being a group of similar ideas;
   receiving clustering results from the distributed computing solution;
   providing the plurality of ideas according to the clustering results, over the network, to the members;
   generating statistical results across multiple brainstorming sessions by analyzing relationships and similarities between topics and ideas across the multiple brainstorming sessions; and
   providing, over the network, the statistical results via a social share page, the statistical results including topic groups, each topic group being an arrangement of topics from the multiple brainstorming sessions, wherein, in response to selection of a topic group from the social share page, providing a list of top ideas for the topic group and information indicating a ranking of the top ideas.

2. The method of claim 1, wherein the receiving a plurality of ideas, over a network, from users includes:
   providing, over the network, an idea submission page to the users for display in response to a new brainstorming event, the idea submission page providing a template to permit the users to submit ideas; and
   receiving, over the network, the plurality of ideas from the users.

3. The method of claim 2, wherein the providing, over the network, an idea submission page to the users for display in response to a new brainstorming event includes:
   providing, over the network, a new brainstorming session template to a host of the brainstorming session, the host being one of the users, the new brainstorming session template providing brainstorming settings for selection by the host;
   receiving, over the network, the selected brainstorming settings including information identifying the members of the brainstorming session;
   providing, over the network, the idea submission page to each of the members.

4. The method of claim 1, wherein the de-duplicating the plurality of ideas at the cloud brainstorming service includes:
   determining whether any synonyms exist for each word in each idea based on a reference dictionary stored in the in-memory database system;
   replacing each word with an assigned word if a synonym exists for a corresponding word;
   calculating a similarity metric for each of the plurality of ideas using a similarity algorithm, the similarity algorithm being a Levenshtein Distance algorithm or Longest Common Substring (LCS) algorithm;
   detecting a duplicate idea if two or more ideas have a similarity metric above a threshold value; and
   deleting the detected duplicate ideas including merging duplicate ideas into a single idea while retaining submitter information for each of the members who submitted the duplicate ideas.

5. The method of claim 1, wherein the automatically arranging the plurality of ideas into the clusters includes:
   parsing the plurality of ideas into word sets;
   removing stop words from each word set;
   extracting words from the word sets;
   selecting feature words from the extracted words;
   transforming text data of the feature words into a plurality of vector space models (VSMs); and
   arranging the plurality of ideas into the clusters based on the VSMs, each cluster having a central point, including calculating a distance from each VSM to the central point of each cluster and assigning a VSM that is closest to the central point of a respective cluster.

6. The method of claim 1, wherein the distributed computing solution is a distributed file system.

7. The method of claim 1, further comprising:
   automatically generating a summary of the brainstorming session, the summary including the plurality of ideas, and the clustering results; and
   storing the summary in the in-memory database system for subsequent retrieval.

8. A system comprising:
   at least one processor coupled to a substrate;
   a non-transitory computer-readable medium having executable instructions that when executed by the at least one processor are configured to implement:
   an in-memory database system including a plurality of index servers; and
   a cloud brainstorming service implemented on one or more application servers, the cloud brainstorming service including a message service component configured to receive a plurality of ideas, over a network, from one or more users of devices, the users representing members of a brainstorming session, and a brainstorming logic component configured to collect, de-duplicate, and store the plurality of ideas in the in-memory database system using the plurality of index servers, wherein the cloud brainstorming service includes a clustering component implemented as a distributed computing solution across multiple application servers, the clustering component being configured to retrieve the plurality of ideas from the in-memory database system and automatically arrange the plurality of ideas into clusters, each cluster being a group of similar ideas, wherein the brainstorming logic component is configured to receive clustering results from the distributed computing solution, and the message service component is configured to provide the plurality of ideas according to the clustering results, over the network, to the members, the cloud brainstorming service including a social share component configured to generate statistical results across multiple brainstorming sessions by analyzing relationships and similarities between topics and ideas across the multiple brainstorming sessions, the social share component configured to provide the statistical results via a social share page, the statistical results including topic groups, each topic group being an arrangement of topics from the brainstorming sessions, wherein, in response to selection of a topic group from the social share page, the social share component is configured to provide a list of top ideas for the topic group and information indicating a ranking of the top ideas.

9. The system of claim 8, wherein the in-memory database system is configured to support real-time analytics and transactional processing, the in-memory database system including a parallel processing store that utilizes row-based, column-based, or object-based storage techniques.

10. The system of claim 8, wherein each index server of the plurality of index servers is associated with a different tenant such that each tenant's brainstorming data is stored separately from brainstorming data of other tenants.

11. The system of claim 8, wherein each index server of the plurality of index servers is associated with its own storage volume, transaction domain, and virtual memory in the in-memory database system.

12. The system of claim 8, wherein the brainstorming logic component configured to de-duplicate the plurality of ideas includes:
determining whether any synonyms exist for each word in each idea based on a reference dictionary stored in the in-memory database system;
replacing each word with an assigned word if a synonym exists for a corresponding word;
calculating a similarity metric for each of the plurality of ideas;
detecting a duplicate idea if two or more ideas have a similarity metric above a threshold value; and
deleting the detected duplicate ideas including merging duplicate ideas into a single idea while retaining submitter information for each of the members who submitted the duplicate ideas.

13. The system of claim 8, wherein the clustering component not only automatically arranges the ideas into the clusters but also automatically determines a category name for each cluster.

14. The system of claim 8, wherein the clustering component is configured to parse the plurality of ideas into word sets, remove stop words from each word set, extract words from the word sets, select feature words from the extracted words, transform text data of the feature words into a plurality of vector space models (VSMs), and arrange the plurality of ideas into the clusters based on the VSMs, each cluster having a central point, the clustering component being configured to calculate a distance from each VSM to the central point of each cluster and assign a VSM that is closest to the central point of a respective cluster.

15. The system of claim 8, wherein the clustering component is configured to parse a phrase of an idea using a vector model trained with training data and automatically assign the idea to a particular category name.

16. The system of claim 8, wherein the brainstorming logic component includes a summary generator configured to automatically generate a summary of the brainstorming session and store the summary in the in-memory database system for subsequent retrieval, the summary including the plurality of ideas, the clustering results, and voting result information.

17. The system of claim 8, wherein the cloud brainstorming service includes a cluster load balancer configured to balance a loading across the multiple application servers of the distributed computing solution.

18. The system of claim 8, wherein the brainstorming logic component includes an idea voting component configured to receive voting information, over the network, from each of the members, and the message service component is configured to provide, over the network, voting results information to be displayed with the plurality of ideas.

19. The system of claim 8, wherein the cloud brainstorming service includes a session management unit configured to manage the brainstorming session, a user management unit configured to manage user information, user registration, and user authorization settings, and a security management unit configured to handle security check rules and authorization checks.

20. A system comprising:
at least one processor coupled to a substrate;
a non-transitory computer-readable medium having executable instructions that when executed by the at least one processor are configured to implement:
an in-memory database system; and
one or more application servers hosting a message service component implemented within an application server layer of the system, the message service component configured to receive a plurality of ideas, over a network, from one or more users of devices, the users representing members of a brainstorming session, the one or more servers also hosting a brainstorming logic component configured to collect, de-duplicate, and store the plurality of ideas in the in-memory database system,
wherein the in-memory database system includes a clustering component implemented within a database layer of the system such that the clustering component is pushed down to the database level of the system, the clustering component configured to retrieve the plurality of ideas from the in-memory database system using an index server, the clustering component configured to automatically arrange the plurality of ideas into clusters and automatically assign a category name to each cluster, wherein the message service component is configured to provide the plurality of ideas according to the clustering results, over the network, to the devices for display via an application programming interface (API) defining a common interface across the members of the brainstorming session, the one or more application servers including a social share component configured to generate statistical results across multiple brainstorming sessions by analyzing relationships and similarities between topics and ideas across the multiple brainstorming sessions, the social share component configured to provide the statistical results via a social share page, the statistical results including topic groups, each topic group being an arrangement of topics from the multiple brainstorming sessions, wherein, in response to a selection of a topic group from the social share page, the social share component is configured to provide a list of top ideas for the topic group and information indicating a ranking of the top ideas.

\* \* \* \* \*